(12) United States Patent
Kaprani et al.

(10) Patent No.: US 9,996,232 B2
(45) Date of Patent: Jun. 12, 2018

(54) CREATING MULTIPLE CURSORS FOR DUPLICATED ENTRY

(71) Applicant: International Business Machines Corporation, Armonk, NY (US)

(72) Inventors: Hema J. Kaprani, Bangalore (IN); Vinay V. Peshave, Pune (IN); Dinesh G. Wadekar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 14/570,167

(22) Filed: Dec. 15, 2014

(65) Prior Publication Data
US 2016/0170601 A1   Jun. 16, 2016

(51) Int. Cl.
G06F 3/0481 (2013.01)
G06F 3/0484 (2013.01)
G06F 17/24 (2006.01)

(52) U.S. Cl.
CPC ........ *G06F 3/04842* (2013.01); *G06F 3/0484* (2013.01); *G06F 17/243* (2013.01)

(58) Field of Classification Search
CPC .............................. G06F 3/0481; G06F 3/0484
See application file for complete search history.

(56) References Cited

U.S. PATENT DOCUMENTS

| 7,825,896 B2 | 11/2010 | Yoshida | |
| 2006/0143571 A1* | 6/2006 | Chan | G06F 3/03543 715/764 |
| 2007/0094619 A1* | 4/2007 | Shirai | G06F 3/04892 715/860 |
| 2008/0259027 A1 | 10/2008 | Yoshida | |
| 2010/0064238 A1 | 3/2010 | Ludwig | |
| 2012/0113007 A1 | 5/2012 | Koch et al. | |

FOREIGN PATENT DOCUMENTS

| CN | 102096551 B | 9/2013 |
| TW | 201040825 A | 11/2010 |

OTHER PUBLICATIONS

"Brackets 0.38 Release (Multiple cursors)", Brackets Blog, Apr. 15, 2014, <http://blog.brackets.io/2014/04/15/brackets-0-38-release-multiple-cursors/>.
"Emacs Rocks! Episode 13: multiple-cursors", provided in Search dated Aug. 5, 2014, <http://emacsrocks.com/e13.html>.

(Continued)

*Primary Examiner* — Andrea Leggett
(74) *Attorney, Agent, or Firm* — Daniel R. Simek

(57) ABSTRACT

A computer processor receives a selection to create a duplicate cursor in addition to a default cursor. The computer processor determines a first position corresponding to a default cursor, and the computer processor stores information about the first position. The computer processor determines a second position in which to create the duplicate cursor, and the computer processor stores information about the second position. The computer processor receives data input for the first position corresponding to the default cursor. The computer processor recalls the information of the first position and the information of the second position, and the computer processor duplicates the data input, which is received, at the first position and at the second position.

18 Claims, 5 Drawing Sheets

(56) References Cited

OTHER PUBLICATIONS

"Multiple Cursors", Cloud9 User Documentation, provided in Post Disclosure dated Jan. 9, 2014, <https://docs.c9.io/multiple_cursors.html>.
"Creating Multiple Cursors for Duplicated Entry", U.S. Appl. No. 14/570,167, filed Jun. 15, 2015, pp. 1-26.
IBM Appendix P, list of IBM patents or patent applications treated as related, pp. 1-2, dated Jun. 15, 2015.
List of IBM Patents or Patent Applications Treated as Related, Appendix P, Filed Herewith, 2 pages.
Koch, et al., "Creating Multiple Cursors for Duplicated Entry", U.S. Appl. No. 14/739,067, filed Jun. 15, 2015.

* cited by examiner

305

300

| PRODUCT SUPPORT FORM - CUSTOMER BILLING INFORMATION | — 310 |
|---|---|
| CUSTOMER NAME | I |
| ADDRESS (NUMBER AND | UNDO |
| | SELECT ALL — 330 |
| | DUPLICATE CURSOR |
| VILLAGE, TOWN, OR CITY | 335 |
| STATE | |
| PHONE NUMBER | |
| EMAIL ADDRESS | |

}— 315

| PRODUCT SUPPORT FORM - CUSTOMER PRODUCT SUPPORT REQUEST | — 320 |
|---|---|
| CUSTOMER NAME | |
| ADDRESS (NUMBER AND STREET NAME) | |
| VILLAGE, TOWN, OR CITY | |
| STATE | |
| PHONE NUMBER | |
| EMAIL ADDRESS | |
| REASON FOR THE TECHNICAL SUPPORT | |
| APPOINTMENT DATE | |
| APPOINTMENT TIME | |

| PRODUCT SUPPORT FORM - CUSTOMER BILLING INFORMATION | | 310 |
|---|---|---|
| CUSTOMER NAME | I | } 315 |
| ADDRESS (NUMBER AND STREET NAME) | | } 370 |
| | | |
| VILLAGE, TOWN, OR CITY | | |
| STATE | | |
| PHONE NUMBER | | |
| EMAIL ADDRESS | | |

350

| PRODUCT SUPPORT FORM - CUSTOMER PRODUCT SUPPORT REQUEST | | | 320 |
|---|---|---|---|
| CUSTOMER NAME | I | UNDO | } 360 |
| ADDRESS (NUMBER AND | | SELECT ALL | |
| | | CREATE CURSOR DONE — 345 / 340 | } 380 |
| | | CREATE CURSOR — 355 | |
| VILLAGE, TOWN, OR CITY | | CLOSE DUPLICATE CURSOR | |
| STATE | | 365 | |
| PHONE NUMBER | | | |
| EMAIL ADDRESS | | | |
| REASON FOR THE TECHNICAL SUPPORT | | | |
| | | | |
| | | | |
| | | | |
| APPOINTMENT DATE | | | |
| APPOINTMENT TIME | | | |

FIG. 3B

CREATING MULTIPLE CURSORS FOR DUPLICATED ENTRY

BACKGROUND

The present invention relates generally to the field of computer-based data entry, and more particularly, to enabling duplicate data entry at multiple cursor locations.

Typically, computer users, such as data operators, production support staff, data consolidators, or system operators, are required to duplicate data entry at multiple locations, on either the same page of a document or form, on different pages of the document or form, or on different documents or forms. In many situations, in which the computer user is not allowed to copy information and paste it into particular sections on the same or a different page, the computer user is forced to re-enter the same information entered in previous sections. This re-entry of information is time consuming and inefficient, particularly in situations where it is essential to quickly enter information.

SUMMARY

According to one embodiment of the present invention, there is provided a method, computer program product, and computer system for multiple cursor duplicate entry. A computer processor receives a selection to create a duplicate cursor in addition to a default cursor. The computer processor determines a first position corresponding to a default cursor, and the computer processor stores information about the first position. The computer processor determines a second position in which to create the duplicate cursor, and the computer processor stores information about the second position. The computer processor receives data input for the first position corresponding to the default cursor. The computer processor recalls the information of the first position and the information of the second position, and the computer processor duplicates the data input, which is received, at the first position and at the second position.

BRIEF DESCRIPTION OF THE DRAWINGS

FIG. 3A is an example screen display of data entry forms illustrating operations of cursor program, in accordance to an embodiment of the present invention.

FIG. 3B is an example screen display of data entry forms illustrating operations of cursor program, in accordance to an embodiment of the present invention.

DETAILED DESCRIPTION

Some embodiments of the present invention recognize that computer users, such as data operators, production support staff, data consolidators, or system operators, are often required to enter copious amounts of duplicate information in multiple places within documents or forms; either on the same page or on different pages. In some situations, the user is not allowed to copy information and paste it into particular sections on the same or different page, and the user is forced to re-enter the same information entered in previous sections. Re-entry of previously entered information is time consuming and inefficient.

Embodiments of the present invention address the need for providing data entry techniques to replicate data input using multiple cursors on a single display screen, and if applicable, multiple cursors across multiple screens, substantially simultaneously. For brevity and convenience, embodiments of the present invention, hereafter, collectively refer to at least, but not limited to, the entry of content, such as text-based content in word processing applications, by keying in the content or utilizing a speech-to-text application to enter the text-based content. In some embodiments of the present invention, content may be copied into multiple positions designated by multiple cursors. Embodiments that enable the use of multiple cursors, controlled by a single device to enter and replicate information in the same window or across multiple windows of a computer, are described below with reference to the Figures.

Figure 1:
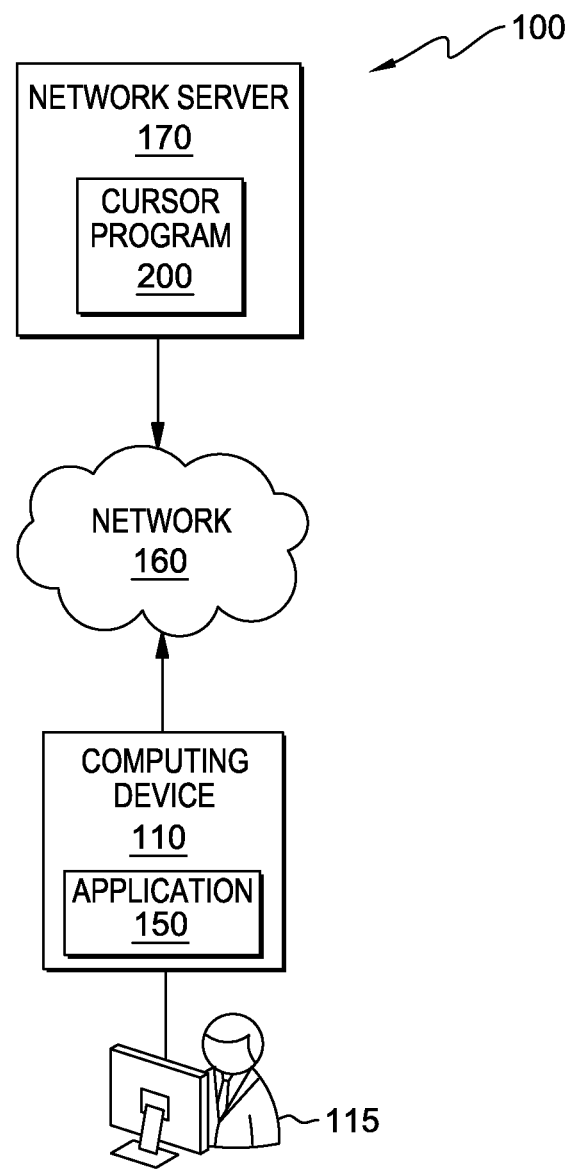
FIG. 1 is a functional block diagram illustrating a distributed computer processing environment, in accordance with an embodiment of the present invention.

FIG. 1 is a functional block diagram illustrating distributed computer processing environment 100. FIG. 1 provides only an illustration of one implementation and does not imply any limitations with regard to the environments in which different embodiments are implemented. Many modifications to the depicted environment can be made by those skilled in the art without departing from the scope of the invention as recited by the claims.

Distributed computer processing environment 100 includes network server 170, which operates cursor program 200. Also included in distributed computer processing environment 100 is computing device 110, usable by user 115. Computing device 110 includes an instance of application 150, which is an application used to connect with network server 170. All devices and corresponding applications operated by the devices are interconnected through network 160.

Network 160 can be, for example, a local area network (LAN), a telecommunications network, a wide area network (WAN), such as the Internet, a virtual local area network (VLAN), or any combination that can include wired, wireless, or fiber optic connections. In general, network 160 can be any combination of connections and protocols that will support communications between computing device 110, network server 170, and other components (not shown) of distributed computer processing environment 100, in accordance with embodiments of the present invention.

Computing device 110 is operated by user 115. Computing device 110 includes an instance of application 150, which enables user 115 to access network server 170 via network 160. Computing device 110 enables user 115 to access one or more applications from network server 170 that utilize a cursor to enter information. In one embodiment of the present invention, user 115, using application 150, may access a data entry application hosted on network server 170 that would benefit from enabling a duplicate cursor or multiple duplicate cursors in the application, to enter information simultaneously in multiple positions of the application. Enabling duplicate cursors in a data entry application allows information entered once by user 115 to be duplicated for each instance of a cursor generated. In another embodiment, computing device 110 includes an instance of cursor program 200 (not shown for computing device 110), which enables computing device 110 to perform data entry on local applications and forms, utilizing the multiple cursor point features of cursor program 200.

In some embodiments of the present invention, computing device 110 can be one of, a web server, a mobile computing device, a laptop computer, a tablet computer, a netbook computer, a personal computer (PC), a desktop computer, or any programmable electronic device or computing system capable of receiving and sending data and performing computer readable program instructions capable of communicating with network server 170, via network 160. In other embodiments, computing device 110 can represent virtual instances operating on a computing system utilizing clustered computers and components (e.g., database server computer, application server computers, etc.) that act as a single pool of seamless resources when accessed within distributed computer processing environment 100. Computing device 110 may include internal and external hardware components, as depicted and described further with reference to FIG. 4.

Network server 170 is a web-based server depicted as hosting cursor program 200, in accordance with an embodiment of the present invention. Network server 170 can be a web server, a blade server, a mobile computing device, a laptop computer, a tablet computer, a netbook computer, a personal computer (PC), a desktop computer, or any programmable electronic device or computing system capable of receiving and sending data, via network 160, and performing computer-readable program instructions. In another embodiment, network server 170 represents a computing system utilizing clustered computers and components (e.g., database server computer, application server computers, etc.) that act as a single pool of seamless resources, such as in a cloud computing environment, when accessed within distributed computer processing environment 100. Network server 170 includes internal and external hardware components, as depicted and described with reference to FIG. 4.

Cursor program 200 is an application that enables generation of multiple cursors that are controlled by a single input device. The multiple cursors may be on the same window or across multiple windows, and enable entry of the same information simultaneously at the multiple cursor locations. In some embodiments of the present invention, while in use to replicate information across multiple windows, cursor program 200 maintains an active state of the selected multiple windows. To keep the selected windows active, cursor program 200 stores a placeholder indicating the initiation of cursor program 200, identifying the position of the original default cursor, and identifying the position of selected additional cursors. The placeholder information identifies the positions of the additional cursors regardless of whether the positions are in the same window or different windows as the original cursor. Cursor program 200 is depicted as included in network server 170 for example purposes, however, the depiction in FIG. 1 is not intended to limit the application and use of cursor program 200. Cursor program may be hosted and operated by other computing devices, such as computing device 110 as described above. The operation of cursor program 200 will be described in more detail below.

Figure 2:
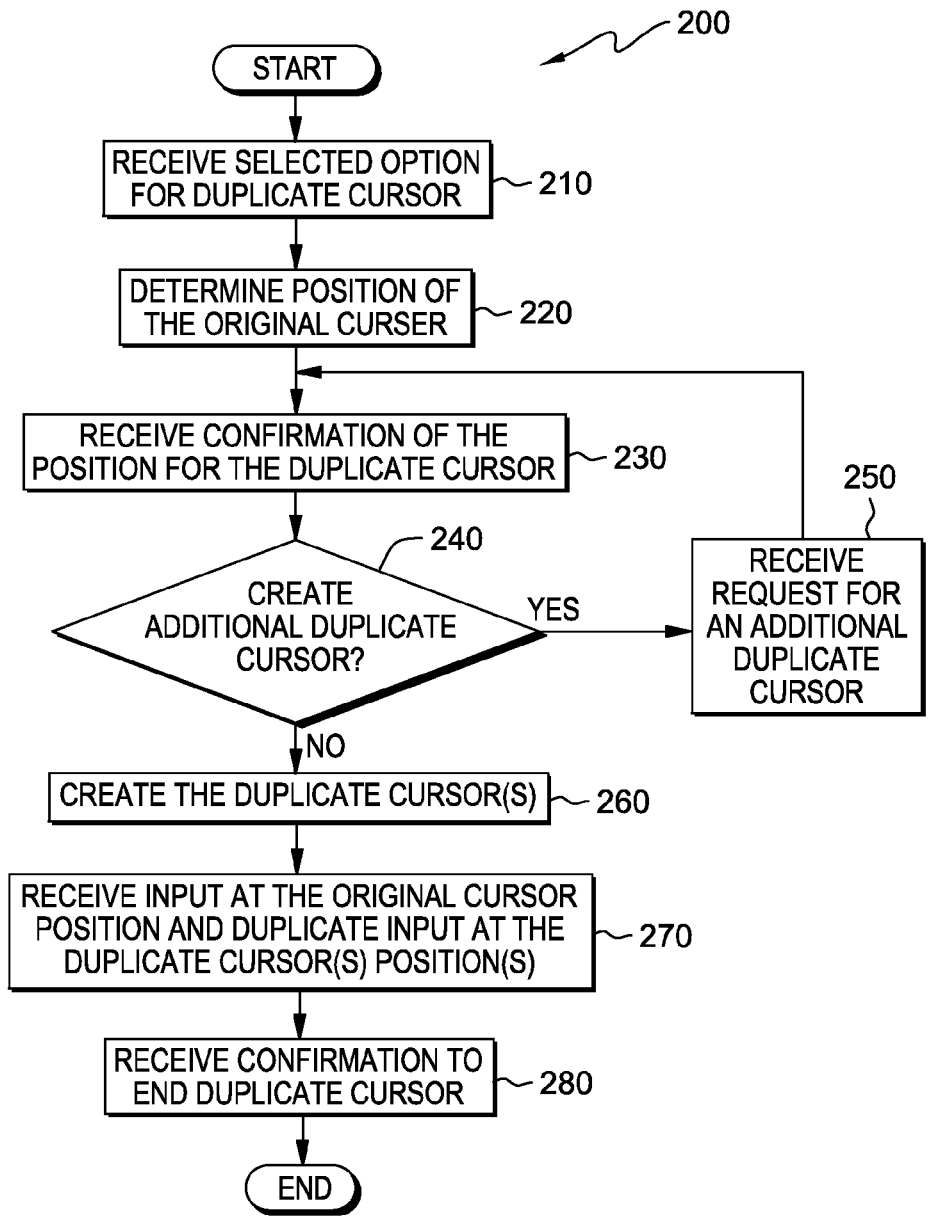
FIG. 2 illustrates operational steps of a cursor program operating on a network server within the distributed computing environment of FIG. 1, in accordance with an embodiment of the present invention.

FIG. 2 illustrates the operational steps of cursor program 200, operating on network server 170 within distributed computing environment 100, in accordance with an embodiment of the present invention. In some embodiments discussed herein, cursor program 200 is initiated by computing devices connecting to network server 170, such as computing device 110, accessing an application hosted on network server 170, via network 160. In some embodiments of the present invention, cursor program 200 may operate in conjunction with an input device for data entry on a connected computing device, such as computing device 110. Examples of an input device may be, but are not limited to, a mouse, keyboard directional arrows and keyboard shortcuts, or voice command applications.

Cursor program 200 receives the selected option for a duplicate cursor (210). The original cursor has been positioned in a desired starting location, and the selection for a duplicate cursor is made. In some embodiments of the present invention, the selection for a duplicate cursor is made by a right click of a mouse to open a drop down menu that includes an option to duplicate the cursor. In other embodiments, the selection for a duplicate cursor is received from pre-determined keystrokes, such as a keyboard shortcut. In yet other embodiments, cursor program 200 receives the selection for a duplicate cursor from an option in a word processor application menu bar, or the selection received may be from a voice command application used to speak a command to duplicate the cursor.

Having received the duplicate cursor selection, cursor program 200 determines the position of the original (default) cursor (220). The starting location for the original cursor may be on an entry field of a file which may be a form of a word processing application, for example. The form may be displayed in one of several open windows on the user's computing device screen, and the default cursor position may be located on a field of the form. For example, the user positions the default cursor on field 1 of form 1 within window 1 on the display screen of computing device 110 (FIG. 1). Cursor program 200 determines and saves the location of the original cursor position.

Cursor program 200 responds to the receipt of the duplicate cursor selection by providing messages to move the original cursor to a desired position, and receives confirmation of the position for the duplicate cursor (230). In some embodiments of the present invention, cursor program 200 generates messages displayed on a computing device screen to move the original cursor to a location corresponding to the desired duplicate cursor position, and confirms the original cursor is in the desired position for the duplicate cursor. Cursor program 200 receives the confirmation of the duplicate cursor position. For example, the desired position for the duplicate cursor may be located on field 10 of form 1 within window 1, or the duplicate cursor position may be located on a different field and form of a second file, for example field 1 of form 2, located in a second file within window 2 on the display screen of computing device 110. The original cursor is moved to the desired position for the duplicate cursor. In some embodiments, the position of the duplicate cursor can be indicated by moving the original cursor using a pointing device, such as, for example, a mouse or the directional arrows on a keyboard. In other embodiments, the position of the duplicate cursor can be indicated by moving the original cursor by using keys such as, but not limited to, the tab and shift key, the tab key, the enter key, the backspace key, or the delete key. In yet other embodiments, a separate active cursor may be generated, with the original cursor displayed and inactive in its present position, and the separate active cursor may be positioned by use of a pointing device or keyboard keys, as described above.

Having received confirmation of the duplicate cursor position, cursor program 200 determines if there is a request for an additional duplicate cursor (decision 240). Cursor program 200 enables multiple duplicates of cursors if requested and, in one embodiment of the present invention, generates a message on the computing device display screen inquiring if an additional duplicate cursor is requested.

Determining that an additional duplicate cursor is requested, (240, "YES" branch), cursor program 200 receives the request for an additional duplicate cursor (250). Having received a request for an additional duplicate cursor, cursor program 200, in one embodiment, may generate messages, to be displayed on a computing device screen. The messages may include instructions to move the original cursor to the next position corresponding to the desired second duplicate cursor position, and instructions to confirm the original cursor is relocated in the desired position for the second duplicate cursor. Cursor program 200 receives the confirmation of the duplicate cursor position (return to 230). For example, cursor program 200 generates a menu or message on the display screen of computing device 110, from which an additional duplicate cursor may be requested. Cursor program 200 receives confirmation from computing device 110 that an additional duplicate cursor is requested and generates a message on the display screen of computing device 110, for example, which includes instructions to move the original cursor to a second location corresponding to the desired second duplicate cursor position. Cursor program 200 receives confirmation from computing device 110 that the location of the cursor in field 10 of form 1 in window 1 is in the desired position of the requested second duplicate cursor. Cursor program 200 determines if an additional duplicate cursor is requested (decision 240) and continues as described above.

For the case in which cursor program 200 determines that no additional duplicate cursors are requested (240, "NO" branch), cursor program 200 creates the duplicate cursor(s) (260). Cursor program 200 recalls the position information associated with the original cursor's initial position and the positions of the duplicate cursor(s), and positions a cursor at the original cursor's position, and generates a cursor at the position of the duplicate cursor(s). For example, cursor program 200 may create the original cursor at a position on field 1 of form 1, in window 1, and create a duplicate cursor at a position on field 10 of form 1, in window 1, of computing device 110. Alternatively cursor program may, for example, create the original cursor at a position on field 1 of form 1, in window 1, and create a duplicate cursor at a position on field 1 of form 2, in window 2, and create an additional duplicate cursor at a position on field 1 of form 3, in window 3, of computing device 110.

Having created cursors at the original cursor position and duplicate cursor position(s), cursor program 200 receives input at the original cursor position and duplicates the input at the duplicate cursor(s) position(s) (270). In some embodiment of the present invention, cursor program 200 displays the original cursor and the duplicate cursor(s) in their respective positions, and enables input to be received and populated in the field of the original cursor, and duplicates the input in the field(s) of the duplicate cursor(s). In other embodiments, the original cursor is displayed in the position corresponding to the initiation of cursor program 200, which is the original position of the original cursor, and does not display the duplicate cursor(s). However, upon entry of input in the original cursor field, the fields corresponding to the positions of the duplicate cursor(s) are populated with duplicate entries of the input. In some embodiment of the present invention, upon completion of the input at the original cursor position, for example, by receiving an input of the enter key, or selection of a completion option, cursor program 200 removes the duplicate cursors, with the original cursor remaining in its last position. In other embodiments, the cursors may be collectively moved to a set of different fields, by use of the tab key, direction arrows, enter key, backspace key, or a pre-defined combination or function key, moving all cursors simultaneously, for example.

Having populated duplicate cursor fields with input, cursor program 200 receives confirmation to end duplicate cursor option (280). In some embodiments of the present invention, cursor program 200 may offer an option to reposition the original default cursor and generate duplicate cursor(s) for a next set of data entry fields (not shown). In the case in which additional duplicate cursors are not requested, cursor program 200 receives confirmation to end the duplicate cursor option, and ends.

In some embodiments of the present invention, subsequent to the input being received, an option to close the duplicate cursor may be presented. The option to end the duplicate cursor may be activated by one of several methods, for example, but not limited to: receiving a selection from a drop down menu option to close the duplicate cursor, opened by a right-click of a mouse; receiving keyed-in input of a pre-determined keyboard shortcut to close the duplicate cursor; receiving a selection from an option in a word processor application menu bar to close the duplicate cursor; or receiving a selection to close the duplicate cursor by a command from a voice command application.

FIG. 3A is an example display screen 305 of data entry forms illustrating operations of cursor program 200, in accordance to an embodiment of the present invention. The example illustrates some embodiments of the operation of cursor program 200 and is not meant to limit cursor program 200 to a single set of operational steps. For brevity and convenience, the example of cursor program 200 is illustrated using product support forms.

FIG. 3A illustrates display screen 305, which is connected to a computing device, such as computing device 110 (FIG. 1), and depicts form 310, used to collect customer billing information, for example. Display screen 305 also includes a display of form 320, which is used to collect information for customer product support, menu 330, and duplicate cursor option 335. Form 310 and form 320 are shown to be in the same window; however, in other embodiments of the present invention, forms 310 and 320 may be in separate windows.

Default cursor 300 is shown positioned in field 315, which is a data field for a customer name and is also a data field duplicated in form 320. In some embodiments of the present invention, default cursor 300 is positioned in form 310 by a pointing device, such as, a mouse or directional arrows on a keyboard, operated by user 115 (FIG. 1) of computing device 110. In other embodiments, default cursor 300 is positioned by using keys such as, but not limited to, combinations of keyboard keys, the tab key, the enter key, the backspace key, or the delete key. Having positioned default cursor 300, menu 330 is opened and includes selectable options applicable to form 310 in which default cursor 300 is positioned. Menu 330 includes option 335, and selecting option 335 initiates cursor program 200, which determines and stores the location of default cursor 300. In one embodiment of the present invention, option 335 is selected by user 115 right clicking a mouse connected to computing device 110. In other embodiments, option 335 may be selected by using directional arrows and the enter key, by selecting options from a tool bar or menu bar of an application, or by using a speech recognition application to execute a selection command. Hereafter, reference made to selection of options will be understood to include one or a combination of the above mentioned techniques, and one of ordinary skill in the art will recognize that embodiments of the present invention are not limited by the selection technique.

FIG. 3B is an example screen display 305 of data entry forms illustrating operations of cursor program 200, in accordance with an embodiment of the present invention. Screen display 305 illustrates form 310, which includes field 315, field 370, and default cursor 300. Display screen 305 also depicts form 320, which includes field 360, field 380, duplicate cursor 350, menu 340, option 345, option 355, and option 365.

Having selected duplicate cursor (option 335, FIG. 3A), cursor program 200 creates duplicate cursor 350. In some embodiments of the present invention, duplicate cursor 350 may be created and positioned overlaying default cursor 300, with the display of duplicate cursor emphasized, for example by bolding, highlighting, font size, alternate shape, blinking, motion, or color change. In other embodiments, duplicate cursor 350 is displayed on display screen 305 and is emphasized for recognition and location by a user. For example, duplicate cursor 350 is presented in a central position of display screen 305 and is bolded and blinking to aid in recognition and location. Duplicate cursor 350 is active and may be positioned by use of available cursor placement techniques, for example, a pointing device, such as a mouse, or directional arrows of a keyboard.

Duplicate cursor 350 is active and is moved to a field in which duplicate entry is desired. Duplicate cursor 350 is positioned in field 360, which is a field in form 320 duplicating the data input of field 315 of form 310. In some embodiments of the present invention, moving the position of duplicate cursor 350 from an initial position, and subsequently leaving duplicate cursor 350 idle, may initiate the display of menu 340. In other embodiments, a keystroke or mouse click, for example, may confirm the position of duplicate cursor 350 and display menu 340. In still other embodiments, menu 340 is displayed in response to a user action, such as right clicking a mouse pointer in field 360 in which duplicate cursor 350 is positioned. Menu 340 displays options, including option 345, option 355, and option 365. Selection of option 345, which indicates that creating duplicate cursors is complete, results in cursor program 200 setting default cursor 300 and duplicate cursor 350 as active in field 315 of form 310, and field 360 of form 320, respectively.

In some embodiments of the present invention, additional duplicate cursors may be desired. Menu 340 includes option 355, and when selected, cursor program 200 creates an additional duplicate cursor that can be positioned in an appropriate data entry field.

Having indicated that creating duplicate cursors is complete by selection of option 345, content is received as input at default cursor 300 and is duplicated at duplicate cursor 350. For example, user 115 of computing device 110, keys in text at the position of default cursor 300 in field 315 of form 310. As the input from user 115 is received, cursor program 200 will display the input at the position of default cursor 300 in field 315 of form 310, and substantially simultaneously, cursor program 200 duplicates the input at the position of duplicate cursor 350 in field 360 of form 320.

In some embodiments of the present invention, the position of active default cursor 300 and active duplicate cursor 350 may be advanced to the next entry field of a form or document, using directional arrows of a keyboard, or by other keyboard keystrokes or combination of keystrokes, such as, but not limited to, the tab and shift key, the tab key, the enter key, the backspace key, or the delete key. For example, selection of the tab key by user 115 of computing device 110 results in advancing both active default cursor 300 and active duplicate cursor 350 to their respective next data entry field. Default cursor 300 moves from field 315 on form 310 to field 370 on form 310. Similarly, duplicate cursor 350 moves from field 360 on form 320 to field 380 on form 320. The default cursor and duplicate cursors are advanced to their respective next field of data entry, within their respective forms.

Subsequent to data entry completion, and without need of additional duplicate cursors, menu 340 is displayed and includes option 365. In one embodiment of the present invention, menu 340 is opened by user action. In other embodiments, menu 340 may open based on completion of character input, and a configured time period transpiring without data entry or cursor movement. Option 365 closes the duplicate cursor functionality and selection of option 365 results in cursor program 200 restoring an active state to default cursor 300 and removal of duplicate cursors, and cursor program 200 ending.

Figure 4:
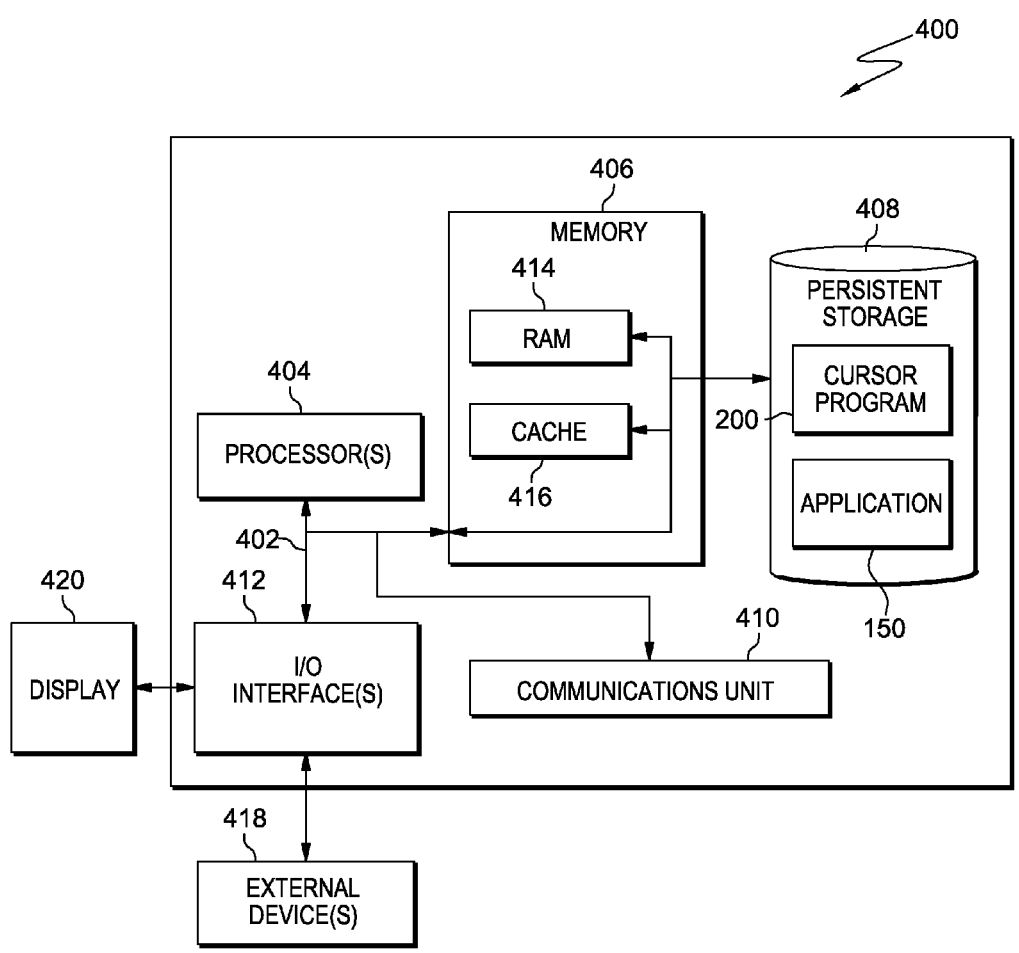
FIG. 4 depicts a block diagram of components of a computing device capable of operating the cursor program, in accordance with an embodiment of the present invention.

FIG. 4 is a block diagram of components of computing device 400, capable of operating cursor program 200 and application 150, in accordance with an embodiment of the present invention. It should be appreciated that FIG. 4 provides only an illustration of one implementation and does not imply any limitations with regard to the environments in which different embodiments are implemented. Many modifications to the depicted environment may be made.

Server 400, network server 170 (FIG. 1), and computing device 110, include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Cursor program 200 and application program 150 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed computer processing environment 100. In these examples, communications unit 410 includes one or more network interface cards. Communications unit 410 may provide communications through the use of either or both physical and wireless communications links. Cursor program 200 and application program 150 may be downloaded to persistent storage 408 through communications unit 410.

I/O interface(s) 412 allows for input and output of data with other devices that may be connected to server 400, network server 170 (FIG. 1), and computing device 110 (FIG. 1). For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., cursor program 200 and application program 150, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and a computer program product. The computer program product may include a computer readable storage medium or media having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:
    a computer readable storage medium having program instructions embodied therewith, wherein the program instructions are executable by a computer processor to cause the computer processor to perform a method comprising:
    receiving, by a computer processor, input to create and activate a duplicate cursor in addition to a default cursor;
    determining, by the computer processor, information descriptive of a first position that corresponds to a current position of the default cursor, and saving the information descriptive of the first position;
    receiving, by the computer processor, information that is descriptive of a second position that corresponds to an intended position of the duplicate cursor, distinct from the first position, wherein the second position that corresponds to the intended position of the duplicate cursor is determined by confirming a repositioning of the default cursor to the second position;
    creating the default cursor at the first position and the duplicate cursor at the second position, wherein both the default cursor and the duplicate cursor are concurrently active;
    receiving, by the computer processor, content as input for the first position that corresponds to the default cursor; and
    duplicating, by the computer processor, the content that is input for the first position, at the second position that corresponds to the duplicate cursor.

2. The computer program product claim 1, wherein the duplicate cursor includes a plurality of duplicate cursors.

3. The computer program product of claim 1, wherein the first position of the default cursor is located on a first window, and the second position of the duplicate cursor is located on a second window.

4. The computer program product claim 3, wherein the information descriptive of the first position includes identification of the first window and the position of the default cursor within the first window, and the information descriptive of the second position includes identification of the second window and the position of the duplicate cursor within the second window.

5. The computer program product claim 1, wherein the first position that corresponds to the default cursor and the second position that corresponds to the duplicate cursor are both located on a first window.

6. The computer program product of claim 1, wherein the information descriptive of the first position and the information descriptive of the second position includes information regarding an application associated with the first position and an application associated with the second position.

7. The computer program product claim 1, further comprising:
    receiving, by the computer processor, a selection to generate a second duplicate cursor at a third position, in addition to the default cursor and the duplicate cursor;
    determining, by the computer processor, the third position that corresponds to the second duplicate cursor; and
    responsive to receiving the content as input for the first position that corresponds to the default cursor, duplicating, by the computer processor, the content which is received as input for the first position, at the third position that corresponds to the second duplicate cursor.

8. The computer program product of claim 1, further comprising:
    positioning, by the computer processor, the duplicate cursor at a location designated by input received from an input device.

9. The computer program product of claim 1, wherein duplication of the content designated as input for the first position, at the second position that corresponds to the duplicate cursor, occurs simultaneously as the content is entered at the first position.

10. A computer system comprising:
    one or more computer processors;
    one or more computer readable storage devices; and
    program instructions stored on the computer readable storage devices for execution by at least one of the one or more computer processors, the program instructions comprising:
    program instructions to receive input to create and activate a duplicate cursor in addition to a default cursor;
    program instructions to determine information descriptive of a first position that corresponds to a current position of the default cursor, and saving the information descriptive of the first position, and saving the information descriptive of the first position;
    program instructions to receive information that is descriptive of a second position that corresponds to an intended position of the duplicate cursor, distinct from the first position, wherein the second position that corresponds to the intended position of the duplicate cursor is determined by confirming a repositioning of the default cursor to the second position;
    creating the default cursor at the first position and the duplicate cursor at the second position, wherein both the default cursor and the duplicate cursor are concurrently active;
    program instructions to receive content as input for the first position that corresponds to the default cursor; and
    program instructions to duplicate the content that is input for the first position, at the second position that corresponds to the duplicate cursor.

11. The computer system of claim 10, wherein the duplicate cursor includes a plurality of duplicate cursors.

12. The computer system of claim 10, wherein the first position of the default cursor is located on a first window, and the second position of the duplicate cursor is located on a second window.

13. The computer system of claim 12, wherein the information descriptive of the first position includes identification of the first window and the position of the default cursor within the first window, and the information descriptive of the second position includes identification of the second window and the position of the duplicate cursor within the second window.

14. The computer system of claim 10, wherein the first position that corresponds to the default cursor and the second position that corresponds to the duplicate cursor are both located on a first window.

15. The computer system of claim 10, further comprising:
 program instructions to receive a selection to generate a second duplicate cursor at a third position, in addition to the default cursor and the duplicate cursor;
 program instructions to determine the third position that corresponds to the second duplicate cursor; and
 responsive to receiving the content as input for the first position that corresponds to the default cursor, program instructions to duplicate the content which is received as input for the first position, at the third position that corresponds to the second duplicate cursor.

16. The computer system of claim 10, further comprising:
 positioning, by the computer processor, the duplicate cursor at a location designated by input received from an input device.

17. The computer system of claim 10, wherein duplication of the content designated as input for the first position, at the second position that corresponds to the duplicate cursor, occurs simultaneously as the content is entered at the first position.

18. The computer system of claim 10, wherein the second position that corresponds to a duplicate cursor, is distinct from the first position that corresponds to the default cursor.

* * * * *